Figure 3:
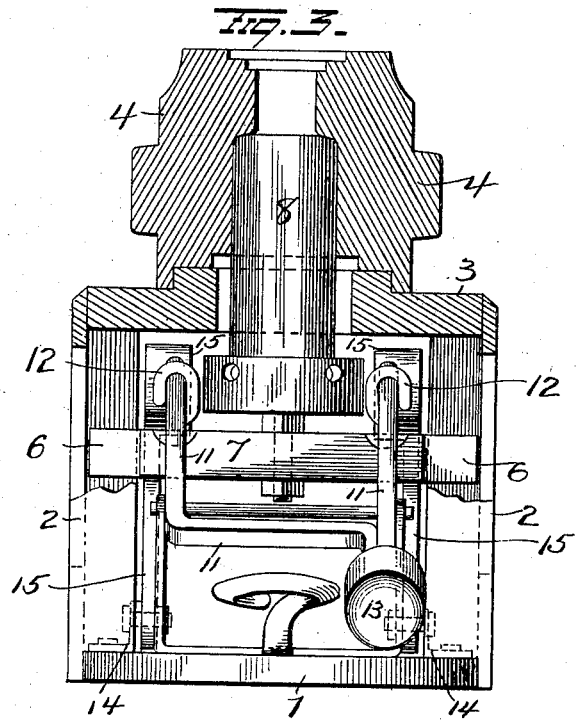

No. 738,845. PATENTED SEPT. 15, 1903.
A. S. REEVES.
BOTTLE MAKING MACHINE.
APPLICATION FILED MAR. 24, 1903.
NO MODEL. 2 SHEETS—SHEET 1.
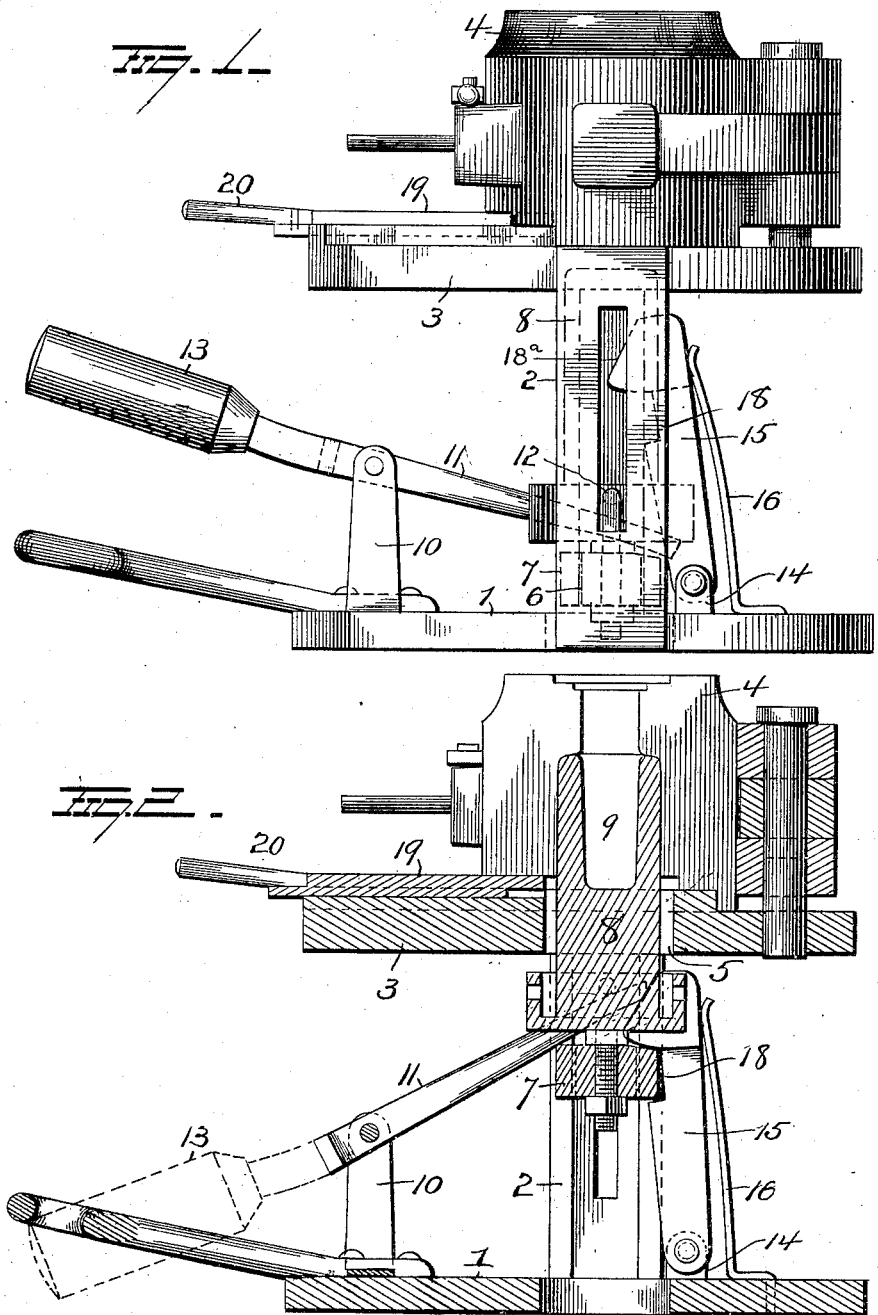
WITNESSES
E. S. Nottingham
G. F. Downing
INVENTOR
A. S. Reeves
By H. A. Seymour
Attorney No. 738,845. PATENTED SEPT. 15, 1903.
A. S. REEVES.
BOTTLE MAKING MACHINE.
APPLICATION FILED MAR. 24, 1903.
NO MODEL. 2 SHEETS—SHEET 2.

WITNESSES
INVENTOR
Attorney

No. 738,845. Patented September 15, 1903.

UNITED STATES PATENT OFFICE.

ALBERT S. REEVES, OF BRIDGETON, NEW JERSEY, ASSIGNOR OF TWO-THIRDS TO JAMES D. COX AND MILTON H. COX, OF BRIDGETON, NEW JERSEY.

BOTTLE-MAKING MACHINE.

SPECIFICATION forming part of Letters Patent No. 738,845, dated September 15, 1903.

Application filed March 24, 1903. Serial No. 149,380. (No model.)

*To all whom it may concern:*

Be it known that I, ALBERT S. REEVES, a resident of Bridgeton, in the county of Cumberland and State of New Jersey, have invented certain new and useful Improvements in Bottle-Making Machines; and I do hereby declare the following to be a full, clear, and exact description of the invention, such as will enable others skilled in the art to which it appertains to make and use the same.

My invention relates to an improvement in bottle-making machines, the object of the invention being to provide improvements of this character which will be extremely simple, cheap to manufacture, and rapid and perfect in operation; and with this object in view the invention consists in certain novel features of construction and combinations and arrangements of parts, as will be more fully described and claimed.

In the accompanying drawings, Figure 1 is a perspective view illustrating my improvements. Figs. 2 and 3 are views in vertical section at right angles to each other.

1 represents a base-plate provided at opposite sides with wide uprights 2, on which a mold-supporting platform 3 is mounted and carries a blow-mold 4 and is made with a central opening 5, communicating with the open center of the mold. The uprights 2 are recessed or grooved longitudinally to receive tenons 6 on the ends of a bar 7 and permit the latter vertical movement therein. This bar 7 has secured thereon a blank mold or charger 8, which latter is made with a pocket 9 to receive the glass to be blown, and the blank mold or charger is adapted to be moved up through the opening 5 into mold 4, as will hereinafter appear.

At one edge of base 1 standards 10 are located, and pivotally supported in their upper ends is a bifurcated lever 11, the arms of which are located in elongated staples or eyes 12 on bar 7, and the lever has a suitable handle-bar or extension 13 to facilitate its operation.

To upwardly-projecting lugs 14 on base 1 catches or dogs 15 are pivoted, and springs 16 are secured to the base 1 and bear against the catches or dogs 15 to normally hold them in operative position. These dogs 15 have notches 18 near their upper ends to receive the bar 7 and hold it in its elevated position, and they have beveled enlargements 18ª on their inner faces at their upper ends to be engaged by the ends of lever 11 and moved out of engagement with the bar to permit the latter to lower. A sliding plate 19 is provided on platform 3 and has a handle 20 to facilitate its movement into and out of the mold. It serves as a bottom for the mold in blowing the bottle and moves in a grooved guide in platform 3.

The operation of my improvements is as follows: Molten glass is placed in the blank mold or charger 8 and the lever 11 operated to raise bar 7 and blank mold, projecting the latter up into mold 4. When in this position, a plunger (not shown) is moved down through the neck of mold 4 to form a recess in the glass and press it against the neck of the mold, so that when the blank mold or charger 8 is lowered the glass will be retained in the blow-mold and in condition for blowing. When bar 7 is raised to its elevated position, the dogs or catches 15 engage the bar in their notches 18 and retain it in an elevated position until lever 11 is swung downward against the beveled enlargements 18ª to force the dogs rearward and release bar 7 and permit it and the blank mold to be lowered.

A great many other changes might be made in the general form and arrangement of the parts described without departing from my invention, and hence I would have it understood that I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. In a glass-shaping machine, the combination with uprights and a mold-platform thereon, of a bar or support movable vertically between said uprights, a blank mold or charger mounted on said bar or support, a lever for raising the bar or support, a spring-pressed dog to engage said bar or support when the latter has been raised and means on the dog coöperating with the forward end of the lever to release the bar or support when the lever is lowered.

2. In a glass-shaping machine, the combination with a mold-platform and uprights supporting the same, of a blank mold or charger, a support therefor movable vertically between said uprights, a lever connected with said support for elevating it, a spring-pressed dog to engage said support when the latter is elevated, and a beveled head on said dog to cooperate with the lever to release said dog when the forward end of the lever is lowered.

3. In a glass-shaping machine, the combination with a mold-platform and slotted uprights supporting the same, of a vertically-movable bar having projections guided in the slots in the uprights, an eye on said bar, a pivoted lever connected with said eye, a pivoted dog to engage the support and having a beveled head to be engaged by the lever, and a blank mold or charger on said bar.

4. In a glass-shaping machine, the combination with a base-plate, grooved uprights thereon, and a blow-mold-supporting platform on the uprights having an opening communicating with the interior of the blow-mold, of a bar having its ends mounted to move in said uprights, a blank mold on the bar to be moved up through the hole in the platform into the blow-mold, a bifurcated lever, elongated staples or eyes on the bar to receive the ends of the lever, spring-pressed dogs or catches having notches therein to engage the bar when the latter is elevated by the lever, and having beveled upper ends to be engaged by the ends of the lever in moving downward to disengage the dogs or catches from the bar and permit the blank mold to be lowered.

In testimony whereof I have signed this specification in the presence of two subscribing witnesses.

ALBERT S. REEVES.

Witnesses:
JOHN DUDLEY,
FRANK SOMERS.